US008126423B2

(12) United States Patent
Dunn et al.

(10) Patent No.: US 8,126,423 B2
(45) Date of Patent: Feb. 28, 2012

(54) E911 LOCATION REPORTING WITHOUT PSAP SUPPORT

(75) Inventors: Douglas L. Dunn, Chula Vista, CA (US); Henry S. Chang, San Diego, CA (US); Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 918 days.

(21) Appl. No.: 11/494,151

(22) Filed: Jul. 26, 2006

(65) Prior Publication Data

US 2008/0026722 A1  Jan. 31, 2008

(51) Int. Cl.
*H04M 11/04* (2006.01)
*H04M 3/42* (2006.01)
*H04H 40/00* (2008.01)
*H04H 60/32* (2008.01)
*H04B 7/00* (2006.01)
*H04N 7/16* (2006.01)
*G06F 15/16* (2006.01)

(52) U.S. Cl. ............... 455/404.1; 455/414.1; 455/3.06; 455/517; 725/62; 725/14; 725/81; 709/228; 709/206

(58) Field of Classification Search .............. 455/404.1
See application file for complete search history.

(56) References Cited

U.S. PATENT DOCUMENTS

| 6,233,445 | B1 | 5/2001 | Boltz et al. |
| 6,973,298 | B2 | 12/2005 | Chang et al. |
| 7,313,402 | B1* | 12/2007 | Rahman et al. ............ 455/456.1 |
| 2002/0077075 | A1 | 6/2002 | Ikonen et al. |
| 2004/0072583 | A1* | 4/2004 | Weng .......................... 455/456.3 |
| 2005/0201529 | A1* | 9/2005 | Nelson et al. ................... 379/45 |
| 2007/0015489 | A1* | 1/2007 | Jennings .................... 455/404.2 |
| 2007/0021125 | A1* | 1/2007 | Zhu et al. .................. 455/456.1 |
| 2007/0280428 | A1* | 12/2007 | McClelland .................... 379/37 |

FOREIGN PATENT DOCUMENTS

WO  WO 02/082832  10/2002

* cited by examiner

*Primary Examiner* — Dwayne Bost
*Assistant Examiner* — Timothy Pham

(57) ABSTRACT

A wireless communications device and network having the ability to detect when a call session with a public service access point (PSAP) has not transferred location information for the wireless device to the PSAP. In on embodiment, the detection means includes a location request timer (LRT), which is started when the emergency call is initiated. If the LRT expires before a request for location information is received by the wireless communications device, the wireless device concludes that the PSAP does not have the location information. In another embodiment the wireless network determines the PSAP does not have location information without a timer. The location information is then presented to a caller on the wireless device, which allows the caller of the wireless device to relay the information to a human PSAP operator. The location information may also be provided to a human PSAP operator in a automated manner.

20 Claims, 3 Drawing Sheets

Wireless Devices On Network With PSAP

Network Entities For Emergency Services

Wireless Device

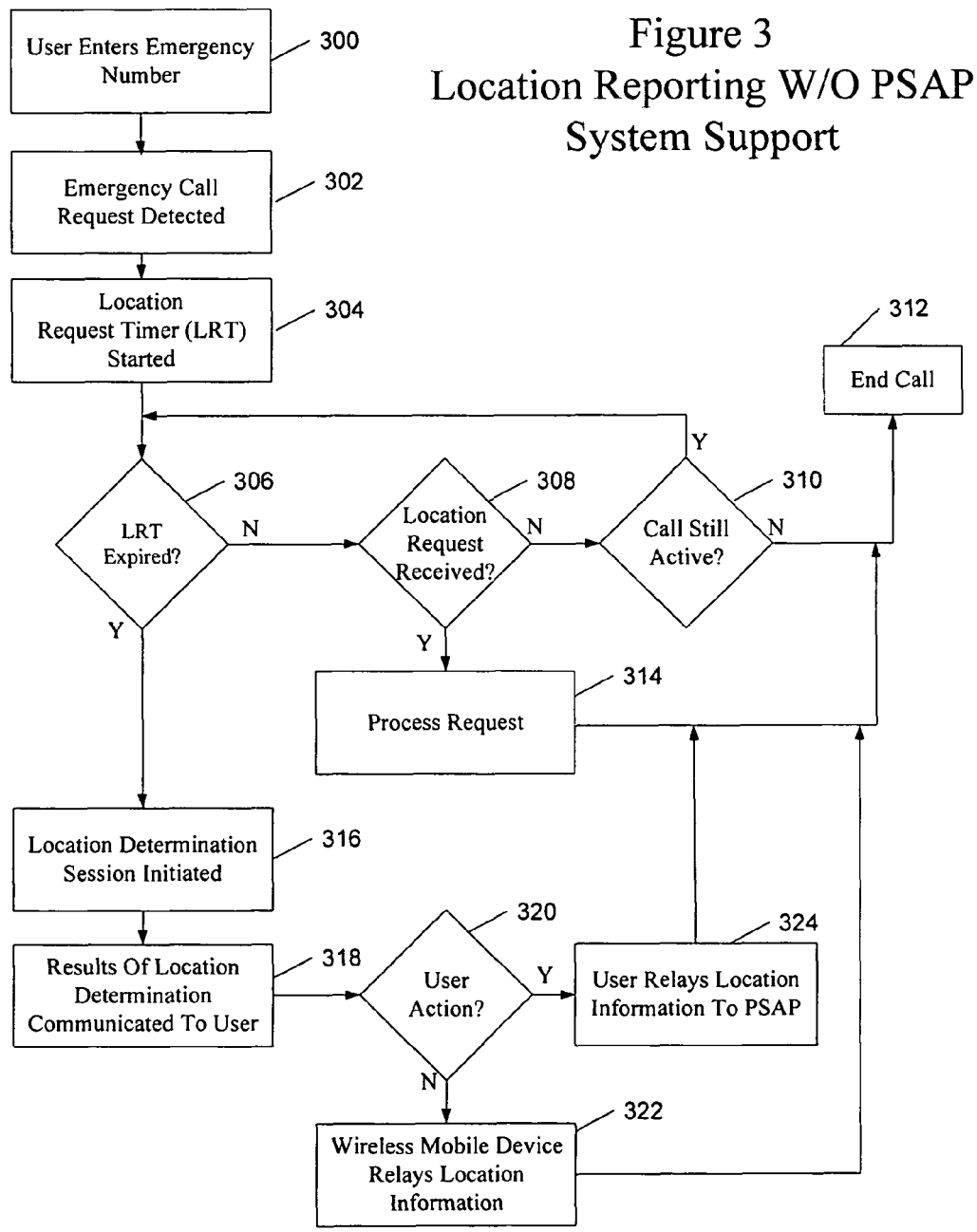

E911 LOCATION REPORTING WITHOUT PSAP SUPPORT

FIELD OF THE INVENTION

The present invention relates to the field of wireless communication devices. More specifically, the invention relates to providing location information when a caller making an emergency call over an air interface is connected to a public safety answering point (PSAP) that cannot receive location information directly from a wireless provider.

BACKGROUND OF THE INVENTION

Enhanced 911 or E911 services are a North American Telephone Network feature used with 911 emergency calls. The goal is to provide a physical location associated with a caller making a 911 (emergency) call to a public safety answering point (PSAP). For 911 calls made on landlines, providing a location to the PSAP is straightforward. The carrier on which the call is made provides the calling number and its associated address to the PSAP. The address information is shown on the PSAP operator's screen during the call. The operator's screen often includes a visual map of the address as well, so the human operator can assist emergency vehicles in getting to the location. Integrating address information into PSAP's operations (databases) has been occurring since the 1970s.

With the advent of wireless communications, providing location information became a significant technical problem. Location information about wireless devices can be derived with various degrees of reliability and specificity. The first solutions derived location information using the location of the cell through which the wireless device or mobile station (MS) was communicating. Additional location information was derived from the MS's signals, which could include the signal's angle of arrival and the signal's time difference of arrival at different cells. Location determination solutions that use location information obtained from the network are called network-based solutions.

Many MSs are now equipped to receive location information directly. One common implementation uses GPS receivers in the MS. However, due to the memory and/or compute-intensive nature of deriving coordinates from the location information, the calculation to determine a set of coordinates from the location information may not be done on the MS, instead the MS sends its location information to the network. The network has the resources to derive coordinates, such as a latitude and longitude, using the location information sent by the MS. The network can also make use of network derived location information in addition to the location information provided by the MS when determining the MS's location coordinates. Location determination methods which use location information provided by the MS are called MS-based, or mobile-based, solutions. These solutions include methods that make use of resources and additional information from the network. MS-based location technologies that use GPS receivers in the MS and use the network for assistance data are usually implemented using assisted GPS, or AGPS. Although MSs using AGPS typically do not make their own position calculations, AGPS itself does not require that limitation.

Another MS-based location technology is Advanced Forward Link Trilateration (AFLT). To determine an MS's location, the MS takes measurements of signals from nearby cells (base stations) and reports the cells' pilot strength and pilot phases back to the network. This information is used by the network to triangulate a location of the MS. At least three surrounding base stations are needed to get optimal location information.

Hybrid location technologies may use both AGPS and AFLT. Hybrid location technologies are useful in urban areas where the GPS signal may be hard to detect or where there is considerable shading and interference.

Currently wireless networks include a network-based position determining entity (PDE) to calculate the mobile's position. The location information it uses may be from the network, the MS, or both; the PDE is used in both MS-based and network-based solutions.

When a 911 call is made from a mobile wireless device, the location information is provided by the wireless carrier to the PSAP from the PDE in the form of a mathematical representation of coordinates. However, there are numerous PSAPs around the country that do not support position information from the wireless carrier. If a connection is made to a PSAP that does not support coordinate-based location information, the network does not request location information from the MS and does not generate location coordinate information. Additionally, the MS will typically not generate location information unless it is requested by the network. Although progress is being made, there may always be PSAPs that can not support position information from wireless carriers.

There is a need for a wireless mobile device that allows an emergency caller to provide location information to a PSAP operator, when the responding PSAP system does not support the location information delivered by a wireless carrier.

SUMMARY

Disclosed herein is a system and method for enabling location information of a wireless mobile device to be communicated to a PSAP operator when the PSAP system can not process location information provided by a wireless carrier. The location information provided by wireless carriers is typically in the form of latitude/longitude coordinates, but includes any mathematical (numerical) way of identifying a physical location.

Any way of determining a physical location is usable with the presently disclosed inventive concepts. In current CDMA-based systems, a handset-based solution is used which typically includes AGPS, AFLT, or hybrid AFLT/AGPS systems. In GSM-based systems, a network-based solution is used which typically includes an enhanced observed time difference of arrival (EOTD) based system.

Further disclosed is the detection that an emergency call is being attempted. This is accomplished by determining that an emergency number has been entered, e.g., 911, and the "send" indicator on the MS pressed. Emergency calls are routed through the wireless network to an Emergency Services Network (ESN) to a PSAP. The PSAP may or may not support location information provided by wireless carriers. If the PSAP does support location information provided by wireless carriers, the wireless network initiates a location session in order to provide the information to the PSAP. A location session comprises all the steps and communications needed between network entities and the MS to determine a location, in accordance with the location technology being used.

One embodiment of the presently disclosed inventive concepts is mobile-based, being used by the MS to determine if a location session was initiated on the network. The MS uses a timer called the location request timer (LRT). The LRT may be started when an emergency call is initiated. The LRT duration will have differing values depending on where in the call sequence it starts. If the wireless network does not initiate a location session by the LRT time-out period, then it may be assumed the PSAP system does not support the wireless carrier's location information. The MS can detect if the location session has been initiated since it must provide location information as part of the location determination process.

Another embodiment is network-based. A network-based solution does not require a timer, as the network will know if the PSAP supports or does not support wireless network location services. If the PSAP does not support wireless location services, the wireless network triggers its own location session upon detection of an emergency call, and can provide the results to the MS.

In both embodiments, the MS has software that supports receiving the location information from the network and presenting it to the user as described in this application.

Continuing with a mobile-based embodiment, the mobile device triggers a location determination session when the LRT expires. This results in information that represents (within the limits of the technology being used) a coordinate-based physical location of the wireless mobile device. That information is then communicated to the caller by various external interfaces on the wireless device, including but not limited to a text display or audio output. "External interface" means any interface on the device intended to be usable or perceivable by a human, including but not limited to a display, a speaker, or a TTY/TDD interface.

The wireless mobile device may make the information available and wait for further actions by the caller. Alternatively, the wireless mobile device may further process the location information by waiting a small amount of time for caller input, and if there is none, sending information to the PSAP that is intended for a human operator. In one embodiment, the information sent to the PSAP operator would be a voice synthesis of the location information. In another embodiment, the location information would be sent as TTY/TDD information.

BRIEF DESCRIPTION OF THE DRAWINGS

FIG. 3 is a flow diagram illustrating an embodiment of the presently disclosed inventive concepts.

DETAILED DESCRIPTION

Persons of ordinary skill in the art will realize that the following description of the present invention is exemplary and not in any way limiting. Other embodiments of the invention will readily suggest themselves to such skilled persons who also have the benefit of the present disclosure.

Figure 1A:
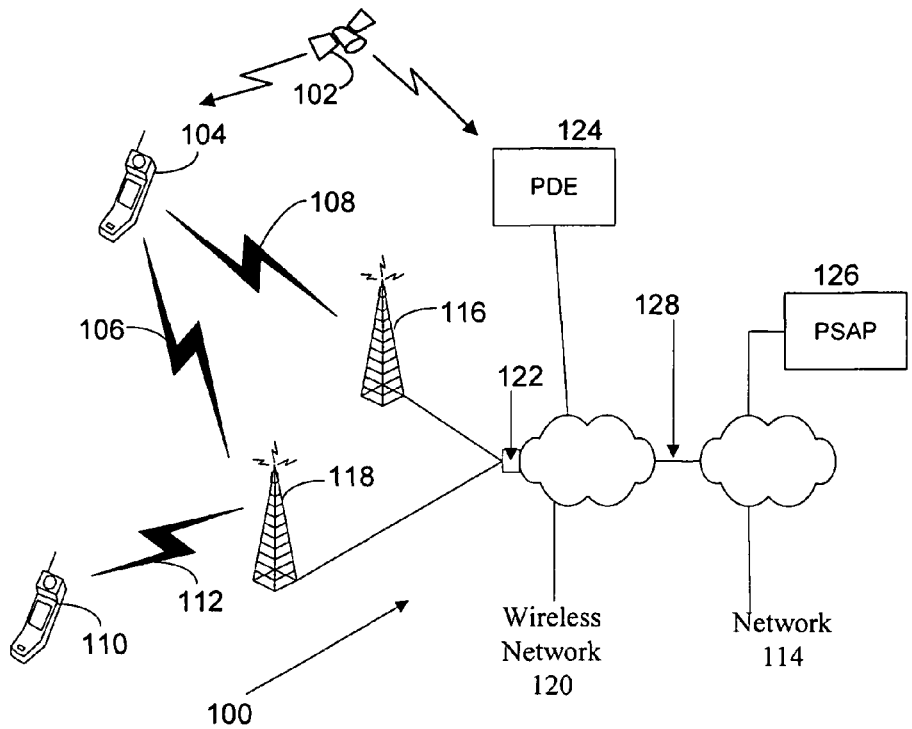
FIGS. 1A-1B illustrate a network and network entities in accordance with the presently disclosed inventive concepts.
Figure 1B:
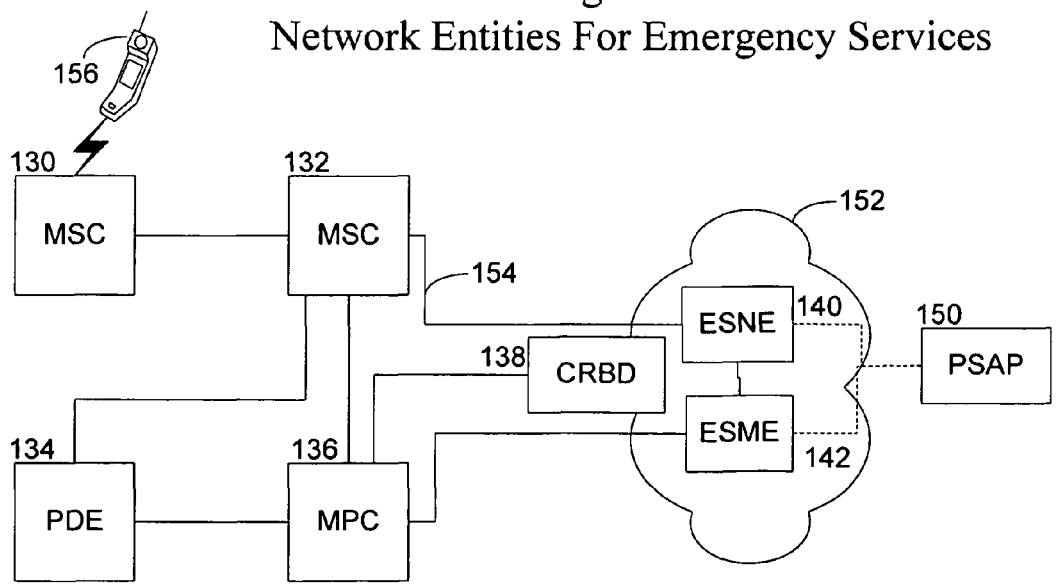
Figure 2:
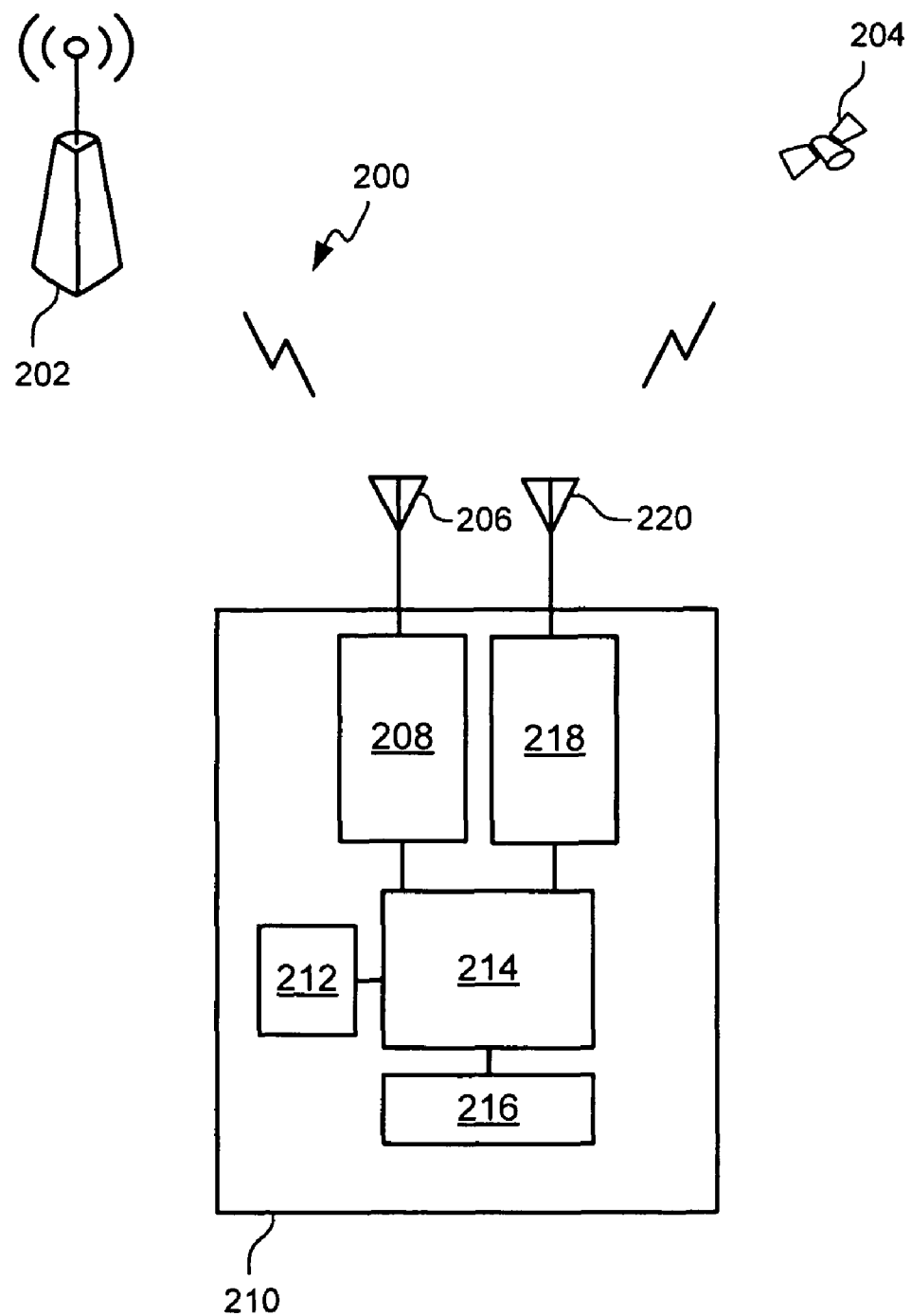
FIG. 2 is a block diagram of a wireless device usable with the presently disclosed inventive concepts.

Referring generally to the drawings, for illustrative purposes the present invention is shown embodied in FIGS. 1 through 3. It will be appreciated that the apparatus may vary as to configuration and as to details of the parts, and that the method may vary as to details and the order of any acts, without departing from the inventive concepts disclosed herein.

The word "exemplary" is used in this disclosure to mean "serving as an example, instance, or illustration." Thus, an embodiment described as "exemplary" is not necessarily to be construed as preferred or advantageous over other embodiments.

The term computer readable medium is used to refer to any media used to provide, hold, or carry executable instructions (e.g., software, computer programs) usable for execution by a central processing unit (CPU, microprocessor, DSP, or any other logic device capable of executing instructions). Media includes, but is not limited to, memory readable by the CPU that can be local, remote, volatile, non-volatile, removable, etc., and can take any suitable form such as primary memory, secondary memory including disks, removable cards or flash, remote disks, etc. Computer readable medium further includes any means for providing executable code, programming instructions, and/or decision inputs to a CPU used in a wireless communication device, base station, or other entity with a CPU. The executable code, programming instructions, decision inputs, etc., when executed by a CPU is used to cause the CPU to enable, support, and/or perform the inventive features and functions described herein.

Referring to FIG. 1A, shown is a high level block diagram of an exemplary network 100, usable with mobile wireless communications devices 104 and 110. The wireless connections, or air interfaces, are shown as links 106, 108 and 112. For the purposes of the present disclosure, mobile wireless communications devices can be any mobile device that can send and receive signals over at least one air interface. When the text in this disclosure uses the term handset or mobile station (MS), it is to be understood that the descriptions herein includes any mobile wireless device with the communications capabilities just described. For example, the device could be a PDA, a portable laptop computer, etc. Other devices will come to the mind of a person skilled in the art who also has the benefit of the present disclosure.

Communication network 100 comprises a plurality of base stations shown as base stations 116 and 118. Each base station is connected to a base station controller (BSC) 122 in wireless network 120. Wireless network 120 will typically connect to network 114, which in one embodiment is an ESN, through a mobile switching center (MSC). The MSC is not shown in FIG. 1A, but would typically be at the wireless network 120 interface of connection 128 between the two networks. PSAP 126 is shown as connecting to network 114. It is to be understood that in general, the PSAP connection using network 114 includes any embodiment, including ESNs, PSTNs, or other embodiments of a network providing connections to a PSAP. In the US, network 114 will typically be a ESN. In other countries the presently disclosed inventive concepts can work with any network 114.

Wireless network 120 includes at least one position determination entity (PDE) 124. PDE 124 may be software on a server, and in one embodiment further includes GPS receivers as part of an AGPS system. The GPS receiver(s) use includes but is not limited to obtaining ephemeris data, almanac data, and determining timing differences between the MS and the network. This is in addition to the PDE performing position calculations, as needed.

Also shown is position satellite 102, which in one embodiment is a GPS satellite. Mobile wireless communications devices 104 and PDE 124 have receivers enabled to receive data from the satellite.

Transmission path 106 indicates that mobile communications device 104 may be in communication with, or having its transmission received by, a plurality of cells. Multi-cell communications would be used with position determination technologies that use the mobile's signal to determine the mobile's location, or the signals from the cells could be used in technologies exemplified by AFLT.

Communications network 100 is a very high level diagram. No limitations as to particulars of connectivity or functionality within the network are to be assumed based on this high-level illustration. For example, PSAP 126 is shown as coming from network 114. Although the common embodiment in the US has the PSAP accessible through an ESN, the connection may be any networked connection allowing operable communications with a PSAP. One satellite is shown; depending on the system, typically a land device will receive data from at least 4 satellites in order to determine a location or position. These and similar relationships between high-level illustrations such as FIG. 1A, and the implementation particulars underlying the high-level illustrations, will be clear to a person of skill in the applicable art who also has the benefit of the present disclosure.

Referring to FIG. 1B, shown are the primary network entities involved during an emergency call. The entire network further comprises entities not shown; the ones illustrated in FIG. 1B are only those typically used for handling an emergency call. FIG. 1B generally complies with E911 phase 2 architecture.

MSC 132 is the mobile switching center that initially received the incoming emergency call. Even if radio control is handed off to another MSC, illustrated in FIG. 1B with MSC 130 being the serving mobile switching center to MS 156, the emergency call remains anchored to the MSC that established first radio contact. PDE 134 determines the position of the MS, as part of a location session on the network. PDE 134 may use make use of one or more location technologies, depending on the network. Mobile Position Center (MPC) 136 selects which particular PDE will be used to determine the location of the MS associated with a particular call. MPC 136 is also the locus for determining who has authorized access to location information resulting from the location session. In the context of the present disclosure this is generally not an issue (the location information will generally be provided to the MS), but if any restrictions were to be implemented, this is the network entity that would make the determination. Exemplar restrictions include the MS being in a restricted area, or the MS being a classified MS.

The Coordination Routing Database (CRBD) 138 provides, as at least one of its services, a translation between physical locations expressed as coordinates, such as latitude and longitude, and a string of digits that identifies an Emergency Service Zone (ESZ). ESZs are used to route the call to an appropriate PSAP. Note: this is for networks serving PSAPs that can make use of wireless network location information (are E911 phase 2 compliant). ESZs are used to route the call to PSAPs based on zones (corresponding to physical areas), when multiple PSAPs are available and cover different physical areas.

Emergency Services Network Entity (ESNE) 140 routes and processes the voice portion of the emergency call. Emergency Services Message Entity (ESME) 142 routes and processes the out-of-bandwidth, or non-voice, portion of the emergency call. Cloud 152 generally represents the emergency service network portion of a network, which interfaces eventually to the PSAP 150. The connection is shown as a dotted line to indicate the connection involves other network infrastructure not illustrated.

Each of the above-described network entities carries out its role during an emergency call from MS 154. Included in MS 154 is the software needed to receive and use location information sent to it by the network according to the presently disclosed inventive concepts. This is different than the AGPS or GPS pseudorange data the MS may provide to the network. The MS functionality is described more fully below.

The lines connecting the network entities are shown as solid, exemplified by line 154, where a typical implementation will have the entities in direct communication with each other. Clearly not all communications in a wireless network are indicated; rather, this diagram is for the purpose of illustrating a high-level architectural overview of network entities involved in one embodiment of the presently disclosed inventive concepts.

Referring to FIG. 2, shown is air interface 200 represented with base station 202. Also shown is an exemplary wireless mobile device 210. Wireless mobile device 210 may be a mobile phone or other mobile wireless device capable of communicating using air interfaces. According to one particular embodiment, wireless mobile device 210 is capable of communicating over air interface 200 using code division multiple access (CDMA), and is further enabled for GPS satellite 204 reception using antenna 220 and receiver 218.

Other Wireless Wide Area Networks (WWAN) standards are also fully contemplated herein, such as GSM and WCDMA, for air interface 200.

Wireless mobile device 210 comprises processor 214 coupled to a memory 212 and to transceiver 208 and receiver 218. Programming is stored in memory 212 and executed by processor 214 for the operation wireless mobile device 210. Transceiver 208 is coupled to antenna 206 for communication with network cell 202. Processor 214 is also coupled to interface 216, which may further be coupled to one or more user-interface (UI) devices (not shown), including but not limited to a display device, input keys, a microphone, a speaker, and TTY/TDD equipment. In the illustrated embodiment location information received from GPS satellites in the wireless mobile device will be sent to the network. Note that memory 212 includes all types of memory, including volatile and non-volatile components, removable, etc.

Referring to FIG. 3, illustrated is a series of actions corresponding to one embodiment of the presently disclosed inventive concepts. The action corresponding to box 300 are those associated with a caller entering an emergency number on a mobile device. Box 300 is left for box 302.

The actions corresponding to box 302 are those associated with detecting that an emergency number has been entered by a caller. In the presently described embodiment, this will be done by the mobile communications device. The detection process can be implemented in any way suitable for the particular device, but would typically include comparing the number entered by the caller to a list of emergency numbers (the list may be a single number), such as 911. The detection process will complete after the caller indicates the call is to be completed. Indicating that the call is to be completed will occur when the caller presses the "call", "send", "go" or other button to indicate to the mobile communications device to initiate the call over the air interface. Any other user interface may be used to indicate the initiation of a call, including alternate input means such as voice recognition.

Continuing from box 302 to box 304, the actions include those needed to start the location request timer (LRT). Starting the LRT can take many forms. Embodiments include starting the LRT when "call" or "send" is pressed, or when a channel is assigned to the call. The timer implementation may be any which enables passage of time to be measured at the needed level of granularity.

Box 304 is left for decision point 306. Decision point 306 represents the actions associated with checking the status of the LRT timer. If the timer has not expired, decision point 306 is left for decision point 308. The actions corresponding to decision point 308 are those needed to check if a location information request has been received by the mobile communications device. If no such messages have been received, then the "N" exit is taken to decision point 310.

Decision point 310 involves checking the status of the call. If the call is not active, the "N" exit is taken to box 312, where any actions needed to finish the call are taken (there may not be any, depending on the mobile communication device's current state). If the call is active, then the "Y" exit is taken to decision point 306. The loop comprised of 306→308→310→306 is repeated until the timer expires, a location request has been received, or the call is terminated.

Looking at decision point 308, if a location request has been received then the "Y" exit is taken to box 314. The actions corresponding to box 314 are any needed to respond to a location determination request. In current CDMA networks, the PDE will request location information from the wireless mobile device, and will then use the provided information to make a location determination and coordinate calculation. The results are sent to the PSAP. Included are any actions needed to reset the LRT timer, set a flag that a location determination request has been received, or any other way of implementing a state that reflects the receipt of the location request. After responding to the request and setting any state variables (if needed), box 314 is left for box 312. Box 312 represents the termination of the call from the perspective of this disclosure. Clearly other communication events will typically take place between the user and the PSAP operator before the call session is finally terminated.

In another embodiment (not illustrated), the PDE will wait until it detects a successful transmission of the position location coordinates to the PSAP. If the PDE does not receive an acknowledgement that the data was successfully received, the PDE may resend the data. If still unsuccessful, process flow continues in box 316.

Returning to decision point 306, if the LRT has expired the "Y" exit is taken to box 316. The actions corresponding to box 316 are those needed to generate a set of location coordinates using the system available to the wireless mobile device and its network. In the embodiment presently being described, the mobile communications device will initiate a location determination session on the wireless network. Once location coordinates or other means of identifying a location are generated, the location information is communicated to the mobile communications device. Box 316 is left for box 318.

The actions corresponding to box 318 are those used to communicate location information to the caller. This can take any form designers think most effectively communicates the information to a user under the circumstances. In one embodiment, location information will be displayed as text information on the wireless mobile device. In another embodiment, a synthesized voice message will be provided to the caller. If the wireless mobile device is TTY/TDD enabled, that form of communication may be used. Other device-person communications may be used as well; the presently disclosed inventive concepts are usable with any human-device interface.

Box 318 is left for decision point 320. Decision point 320 represents an embodiment where a caller-response to the location information presented in box 318 is detected and acted upon by the wireless mobile device. If a user action is detected after the location information is put into user-receivable form, it is assumed the user is using the location information. User actions are indicated by button presses, vocoder activity, or any other activation of a component of the MS associated with user activities. Activation of any one or more of these indicates user interaction with the MS. This corresponds to the yes exit, which continues into box 324. The actions corresponding to box 324 are those associated with a user communicating location information to a PSAP operator. After the communication is done, box 324 is eventually left for box 312, corresponding to ending the call.

If no user action is detected at decision point 320, the no exit is taken to box 322. The actions corresponding to box 322 are those needed for the mobile communications device to automatically generate a response targeting the PSAP operator. The auto-generated response will generally match the interface that had been used to communicate the location to the user. If a TTY/TDD device was used, a TTY/TDD response (in electronic form) will be generated and sent to the PSAP operator. If a synthesized voice output was used to communicate the location information to the user, the same source can be used to send an electronic voice signal to the PSAP operator, which will then be heard by the PSAP operator as voice location information. Box 322 is then left for box 312, eventually terminating the call.

Combinations of caller interfaces may be used as well. For example, text may be provided on the mobile communications device's screen. The device may wait until the caller takes an action (button press, vocoder activity). If no action is taken by the caller after a predetermined amount of time, the device may assume the text message was not received by the caller (perhaps because the caller can't see, is trapped out of direct visual sight of the screen, is unconscious, etc.) and may then use a synthesized voice to attempt audio communication with the caller.

Variations in sending location information are fully anticipated, including repeating the automatic transmission a set number of times, using a timer to determine when to stop sending location information, or until a response is detected from the a PSAP operator. The embodiment used will depend on the system in which it is to be used, and what designers decide is complementary to the assumed state of the user. For example, most implementations will make the assumption that no user input means the user is incapacitated, so the automated response will take into consideration that fact that the user needs help and cannot respond.

The embodiment just discussed is usable with current CDMA systems interacting with mobile communication devices having AGPS. Current CDMA systems in North America mostly conform to this configuration. However, it is fully contemplated that the inventive concepts disclosed herein are usable with other system configurations as discussed above.

From the above description of exemplary embodiments of the inventive concepts described herein, it is clear that various techniques can be used for implementing the disclosed concepts without departing from the inventive scope of the disclosure. While the invention has been described with specific reference to certain embodiments, a person of skill in this art who also has the benefit of the present disclosure will recognize that changes can be made in form and detail without departing from the spirit and the scope of the inventive concepts disclosed herein. For example, any location determination technology usable with a mobile device may be used while still staying well within the inventive concepts disclosed.

What is claimed is:

1. A method for enabling communication of location information from a mobile communications device to a Public Safety Answering Point (PSAP) system that cannot process location information from a wireless service provider, the method comprising:

detecting input of an emergency number;

detecting an indication that a Public Safety Answering Point (PSAP) that cannot process location information from a wireless service provider does not have location information, the indication at least partially based on an elapsed time;

generating location information corresponding to a current location of the mobile communications device; and making the location information available to at least one external interface on the mobile communications device.

2. The method of claim 1 where the generating location information further comprises using Global Positioning System (GPS) pseudorange data received by the mobile communications device.

3. The method of claim 2 where the generating location information further comprises processing the GPS pseudorange data by the mobile communications device.

4. The method of claim 2 where the generating location information further comprises:
sending the GPS pseudorange data to a network; and
receiving location information from the network.

5. The method of claim 1 where the at least one external interface comprises text displayed on a screen.

6. The method of claim 1 where the at least one external interface comprises audio output.

7. The method of claim 1 where the at least one external interface comprises:
displaying the location information text on a screen; and
outputting the location information to an audio interface.

8. The method of claim 1 where the detecting an indication further comprises:
using a location request timer (LRT) on the mobile communications device to indicate that the PSAP does not have location information.

9. A method for enabling the communication of location information of a wireless mobile device to a Public Safety Answering Point (PSAP) system that cannot process location information from a wireless service provider, the method comprising:
detecting an indication that a Public Safety Answering Point (PSAP) that cannot process location information from a wireless service provider does not have location information, the indication at least partially based on an elapsed time;
determining location information of the wireless mobile device;
enabling the location information to be available to the wireless mobile device; and
providing the location information to the PSAP.

10. The method of claim 9 where the indication that the PSAP does not have location information further comprises:
failing to receive, by a position determining entity (PDE), a location determination request.

11. The method of claim 9 where the indication that the PSAP does not have location information further comprises:
failing to receive by the wireless mobile device a request for location information before a location request timer (LRT) expires.

12. The method of claim 9 where the determining location information further comprises:
using Global Positioning System (GPS) pseudorange data received by the wireless mobile device.

13. The method of claim 12 where determining location information further comprises:
processing the GPS pseudorange data by a network component.

14. The method of claim 12 where determining location information further comprises:
processing the GPS pseudorange data by the mobile wireless device.

15. The method of claim 9 further comprising:
sending the location information to the mobile device; and
providing the location information to the PSAP using the mobile device.

16. The method of claim 9 further comprising:
receiving a request for the location information from the mobile device; and
providing the location information to the mobile device in response to the request.

17. A method for enabling communication of location information for a wireless mobile device, the wireless mobile device accessing a Public Safety Answering Point (PSAP) system, the PSAP system being unable to process location information from a wireless carrier, the method comprising:
detecting an emergency call request;
detecting an indication that a Public Safety Answering Point (PSAP) that cannot process location information from a wireless service provider does not have location information, the indication at least partially based on an elapsed time;
determining location information associated with a physical location of the wireless device; and
enabling the location information to be available for at least one external interface on the wireless mobile device.

18. The method of claim 17 where the detecting an indication that the PSAP does not have location information further comprises basing the indication a location request timer (LRT).

19. The method of claim 17 where the at least one interface comprises one of: a video interface, an audio interface, or, a Teletypewriter/Telecommunications Device for the Deaf (TTY/TDD) interface.

20. The method of claim 19 further comprising:
sending, using the location information provided over the at least one interface, the location information in a manner receivable by a PSAP operator.

* * * * *